United States Patent Office 3,404,983
Patented Oct. 8, 1968

3,404,983
YEAST LEAVENED BREAD IMPROVER AGENT AND COMPOSITIONS AND PROCESSES EMPLOYING THE SAME
James F. Conn, St. Louis, and Thomas P. Kichline, Chesterfield, Mo., assignors to Monsanto Company, St. Louis, Mo., a corporation of Delaware
No Drawing. Filed Apr. 26, 1965, Ser. No. 451,016
20 Claims. (Cl. 99—90)

ABSTRACT OF THE DISCLOSURE

A synergistic bread improver agent comprising (1) a monoalkali metal orthophosphate and (2) monocalcium orthophosphate used in amounts of at least about 0.6 part per 100 parts of flour is effective in imparting improved dough characteristics to yeast leavened bread and in improving processes for the production of bread.

---

This invention relates in general to yeast leavened bread. More particularly, it relates to novel bread improver agents, compositions containing the novel bread improver agents, and the use of the compositions in the production of yeast leavened bread.

The older "conventional" process and the newer "continuous" process are the two basic processes generally used for the commercial production of yeast leavened bread. In general, the "conventional" process consists of mixing flour, water and necessary additives to form a dough which is developed during the fermentation that starts during the mixing and continues up to a relatively short time before the bread is completely baked. In contrast, in the "continuous" process, the dough is mechanically developed by high speed mixing after flour and other essential additives have been added to a liquid brew medium in which a major portion of the fermentation has occurred prior to adding most of the flour and other additives.

Regardless of whether the "conventional" or the "continuous" process is used, it is desired to produce a loaf of bread which has, among other things, good volume, a tender crust, fine grain, soft texture, good aroma and taste and toasting qualities. Since numerous factors are important to bread quality, various additives are therefore used to improve one or more of the qualities of bread. For example, because the pH during fermentation and dough development has an important bearing upon the finished characteristics of bread, a buffering agent is generally used to control the pH at the proper level. Since monocalcium orthophosphate has good buffering characteristics, among other desirable properties, it is extensively used as a bread additive.

Nonfat dry milk solids have been widely used in bread as an additive to improve flavor, crust color and toasting qualities, as well as to add nutrient value to the bread. In conventional processes, up to 6% milk solids can be generally used in the bread with no inherent difficulties. However in the continuous process when more than about 2% of milk solids are used in the bread, such qualities as texture and grain of the bread can be adversely affected. Therefore, continuous process bread generally contains below about 2% milk solids. It is to be noted that the method generally used by the baking industry to express the level of ingredients is used herein, that is, all parts, percentages and proportions are by weight using flour as a basis. For example, when it is stated that milk solids are added in amounts of 2%, this means that 2 parts by weight of milk solids are used per 100 parts by weight of flour.

It is also known that different types of flour vary in quality and such quality variations are measurably reflected in the "mixing tolerance" of the dough produced from the flour. "Mixing tolerance" is the ability of a dough to produce acceptable bread even though it is subjected to varying mixing inputs, that is, varying degrees of agitation and/or varying times of agitation. In general, a flour which can be mixed with large variations in mixing input without adversely affecting bread quality has a high mixing tolerance and is usually more expensive than one with a low mixing tolerance. Since mixing input can vary in both the continuous and conventional processes, a high mixing tolerance flour is generally desired.

It is believed, therefore, that a novel bread improver agent which not only acts as a buffering agent during the fermentation and dough development but also improves the quality of yeast leavened bread, enables the use of relatively high amounts of milk solids in the continuous process for producing bread and improves the mixing tolerance of flour would represent a significant advancement in the art.

It is an object of this invention to provide a novel bread improver agent which when added to yeast leavened bread dough will improve the quality of bread.

It is still another object of this invention to provide a novel bread improver agent which will enable the continuous production of a high quality bread even with a relatively high nonfat milk solids content.

It is a further object of this invention to provide a novel bread improver agent which when added to flour improves the characteristics of the dough produced from the flour.

It is a still further object of this invention to provide improvements to both the continuous and conventional process for the production of bread by the use of a novel bread improver composition.

It is an additional object of this invention to provide a flour mixture (containing a novel bread improver agent) which has an improved mixing tolerance.

It is still an additional object of this invention to provide a yeast food composition containing a novel bread improver agent.

Other objects of this invention will become readily apparent to one skilled in the art from the following detailed description.

The present invention, comprising (1) monoalkali metal orthophosphates and (2) monocalcium orthophosphate, provides bread improver agents, which not only provide a buffering action but also improve dough characteristics and bread quality when incorporated, in proper amounts and in proper proportions, in a flour dough prior to baking the dough to form yeast leavened bread; all of which will be more fully discussed hereinafter. The bread improver agents of this invention improve such bread qualities as grain, texture and volume, enable the use of relatively large amounts of nonfat dry milk solids in the continuous process for producing bread, and improve the desirable dough characteristics of extensibility and mixing tolerance.

Although any monoalkali metal orthophosphate salts or mixtures thereof can be used to practice this invention, it is preferred to use monoammonium orthophosphate, monopotassium orthophosphate, monosodium orthophosphate and mixtures thereof with monoammonium orthophosphate being especially preferred. Ammonium is included herein as an alkali metal in view of the fact that monoammonium orthophosphate exhibits substantially the same chemical properties as the monosodium orthophosphate and monopotassium orthophosphate. Although the monoalkali metal orthophosphates of monolithium, monocesium, and monorubidium can, in some cases, be used in the bread improver agent, since they are relatively expensive and not readily available, they are not the preferred salts. Because the monoammonium, monopotassium and monosodium orthophosphate are, in general, the most widely used monoalkali metal orthophosphates and are relatively inexpensive, they are the preferred monoalkali metal orthophosphates.

Although any weight ratio of monoalkali metal orthophosphates to monocalcium orthophosphate in the bread improver agent which is effective for imparting improved dough characteristics can be used, such as for example, from about 1:10 to about 10:1, it has been found in most cases that weight ratios of the monoalkali metal phosphate to monocalcium orthophosphate from about 1:4 to above 4:1 are preferred for producing the beneficial results hereinafter described and weight ratios of from about 1:3 to 3:1 are especially preferred.

In order to achieve the desired beneficial results, it is necessary to use the bread improver agents of this invention in amounts above about 0.6%. Generally it is preferred to use from about 0.6% to about 1.3%, although amounts as high as 1.5% can be used in some cases to achieve beneficial results and if it is desired even higher amounts, such as 5%, can be used although the use of the higher amounts can, in some instances, result in an acid taste being imparted to the bread.

In the manufacture of bread by the continuous process in which milk solids are used in amounts greater than about 2%, it is especially preferred to use a bread improver agent in which the weight ratio of the monoalkali metal phosphate to monocalcium orthophosphate is from about 3:1 to 1:3 in amounts from about 0.8% to about 1.2%.

It is preferred in the practice of this invention to use a particulated bread improver agent to thereby achieve desired solubility in the brew and/or dough. In preparing the bread improver agent, it is preferred to use a monocalcium phosphate having at least about 99% by weight passing through a U.S. Standard 100 mesh screen and at least about 85% by weight passing through a U.S. Standard 200 mesh screen. It is also preferred that the monoalkali metal phosphate components have essentially 100% by weight passing through a U.S. Standard 20 mesh screen, at least about 96% by weight passing through a U.S. Standard 40 mesh screen and at least about 40% by weight passing through a U.S. Standard 200 mesh screen. Although it is especially preferred to use a bread improver agent having essentially 100% by weight passing through a U.S. Standard 20 mesh screen, at least about 95% by weight passing through a U.S. Standard 40 mesh screen and at least about 20% by weight passing through a U.S. Standard 200 mesh screen, larger particle sizes can be used. For example, desired results can be achieved from the use of a bread improver agent (which contains the amounts and proportions of monoalkali metal phosphates and monocalcium orthophosphate as specified herein), which has larger particle sizes than the preferred sizes and which will dissolve in the brew or in the dough.

CONVENTIONAL PROCESS

In the conventional process for producing yeast leavened bread, several ingredients such as water, yeast, yeast food, salt, sugar, malt, milk solids, shortening, buffering agents, and oxidants are combined with the flour to thereby form a dough. The "straight" dough method and the "sponge and dough" method are the two methods commonly used in bread manufacture by the "conventional" process. In the "straight" dough method, all of the ingredients are mixed together in a single batch, the ingredients are allowed to rest for about 2 to about 5 hours, then the dough is subjected to the steps of dividing, rounding, intermediate proofing, molding, panning and final proofing before baking. The fermentation starts during initial mixing and continues up to a relatively short time before the bread is completely baked. In the "sponge and dough" method, part of the ingredients are mixed together to form a "sponge." For example, about 50 to 75% of the flour is mixed with yeast, yeast food, malt, and buffering agents to form a "sponge." The fermentation proceeds for 3 to 5 hours in the "sponge" before the remaining flour, milk solids, shortening, sugar, and other ingredients are added. After these latter ingredients have been added, the dough is allowed to "relax" for about 10 to about 40 minutes, after which the subsequent steps of dividing, rounding, proofing, molding, and baking are conducted. The "sponge and dough" method generally produces higher quality bread and the method is more adaptable to some degree of mechanization. For these reasons, most bakeries that produce "conventional" bread use the "sponge and dough" method. In both methods during the fermentation step, the cell structure is chemically "developed" to strengthen the cell wall structure which increases carbon dioxide retention without rupturing.

Although beneficial results can be achieved in the practice of this invention by incorporating the bread improver agent into the bread making process at any stage prior to baking, it is preferred to add the agent at the start of fermentation. Because of the buffering action exhibited by the bread improver agent when relatively large amounts of nonfat dry milk solids are used, it is particularly preferred to incorporate it into the process prior to or together with the addition of the milk solids.

Although the manner of adding the bread improver agent can depend upon the stage of the process at which it is added, in general, any conventional means for adding solids to the bread making process can be used, for example, the bread improver agent of this invention can be added by admixing it with the other dough forming ingredients at the time of preparation of the dough in the straight dough method or at the time of preparation of the sponge in the sponge and dough method. In addition, the agent can be admixed with one or more of the other ingredients prior to forming the dough. Also, by incorporating the proper amounts of the bread improver agent into the flour used, desired levels in the dough can be obtained. Another suitable method to use the composition of this invention in bread is to add a sufficient amount of the agent in the water used in the preparation of the bread dough to thereby give the proper amount of the additive in the dough. It is especially preferred, however, to incorporate the bread improver agent in the form of a yeast food composition as hereinafter described.

It is to be further understood that although it is preferred to add the monoalkali metal orthophosphate and the monocalcium orthophosphate to the bread making ingredients in an admixture, if desired the components of the bread improver agent of this invention can be added separately and the beneficial results can be achieved.

It is also preferred that the bread improver or the components thereof be uniformly distributed through the dough after their addition. In general, therefore, agitation of the dough forming materials after the bread improver agent is added is beneficial to insure the before-mentioned uniform distribution.

CONTINUOUS PROCESS

In the "continuous" process, as previously mentioned, the fermentation occurs in the brew. One method commonly used employs a blending tank in which such ingredients as sugar, yeast, yeast food, buffering agents, and up to about 50% of the flour are dissolved and suspended. The brew is transferred to one of two hold tanks, with one being filled as the contents of the other are being used. The liquid ferment, after being in the hold tank for about 2½ hours, flows to another tank in which more fermentable sugar can be added. The material from this tank enters a mixer where the balance of flour, shortening and an oxidant, such as an aqueous solution of potassium bromate and/or potassium iodate, are added. The dough is then transferred to a high speed mixer where the dough is developed in about 1 to 2 minutes. Directly attached to this mixer is a divider-panner which extrudes and cuts the dough into individual pieces of exact and uniform weight and drops them into baking pans. The final proofing is conducted under relatively warm and relatively high humidity conditions for about 30 to 70 minutes just prior to baking. Another commonly used continuous bread process is similar, however, little or no flour is added to the "brew." The brew is made by adding the ingredients of water, sugar, yeast, yeast food, buffering agents in several tanks. The fermented brew is then pumped to a hold tank from which it is transferred to a premixer where the flour, shortening, oxidants and any other dough forming ingredients are added. From the premixer to baking the two methods are essentially identical.

Although in the practice of this invention in the continuous process for the production of bread beneficial results can be achieved by incorporating the bread improver agent in the dough at any time prior to baking, it is especially preferred to incorporate the bread improver into the process during the fermentation step in a yeast food composition as hereinafter described. It is also preferred to add the monoalkali metal orthophosphate and monocalcium orthophosphate simultaneously although these components, in some instances, it can be desirable to add the components separately. In a continuous process employing multistage brew steps and in which milk solids are used in amounts in excess of 2%, it is preferred to add the bread improver agent of this invention at the first stage of the fermentation step to control the pH during the addition of milk solids. The bread improver agent can be added to the process in the same manner as other ingredients. For example, the proper amount of bread improver agent can be added at the brew stage as a solid. In addition, the bread improver agent can be added in desired amounts to the water used in the production of the bread prior to adding the water to the process. Another suitable method is to admix the bread improver agent with one of the solid ingredients such as flour prior to adding such ingredients into the process. In general, any means of adding the bread improver agent of this invention to the process prior to baking will enable the achievement of the beneficial values therefrom.

To illustrate the advantages of this invention the following examples are given. Using the method of expression commonly used by the baking industry, all parts, percentages, and proportions are by weight using flour as a basis unless otherwise indicated.

EXAMPLE I

In this example, various doughs were tested for their "resistance to extension" which is a measure of the ability of a dough to be stretched without breaking. Doughs with good "resistance to extension" have been found to give bread which has good grain, texture, and volume. A conventional instrument used to measure the resistance to extension of doughs is the Brabender Extensograph in which a measured quantity of a nonfermented dough is subjected to a stretching force. The sample is extended by increasing the stretching force, thus the amount of force necessary to cause the sample to rupture is a measure of the extensibility of the dough. A nonfermented dough is used to avoid the errors which would be introduced by the liberation of carbon dioxide which occurs in a fermented dough.

Doughs were prepared by mixing the following parts by weight of ingredients:

Flour _____ 100
Water _____ 65
Salt _____ 4
Bread Improver Additive _____ 1

Five bread improver additives were tested. Additive 1 was monosodium phosphate; Additives 2, 3 and 4 were bread improver agents of this invention in the proportions given below and Additive 5 was monocalcium phosphate. After the doughs were prepared, the doughs were tested using A.A.C.C. Extensograph Method No. 54–10 modified, however, for 90-minute rest periods in order to have the test more closely correspond to a continuous process dough. The following table presents the results of the tests.

TABLE I

| Additive: | Maximum resistance (grams) |
|---|---|
| 1 (100% MSP) | 610 |
| 2 (3:1 MSP:MCP) | 700 |
| 3 (1:1 MSP:MCP) | 740 |
| 4 (1:3 MSP:MCP) | 710 |
| 5 (100% MCP) | 550 |

MSP = Monosodium phosphate.
MCP = Monocalcium phosphate.

The results of the above tests clearly illustrate the superiority of doughs containing the bread improver agents of this invention. The synergistic effect produced by the combination of the two phosphates is apparent as Additives 2, 3 and 4 gave considerably better resistance to extension than did either Additive 1 (monosodium phosphate alone) or Additive 5 (monocalcium phosphate alone). The improvement in resistance to extension indicates that the subject bread improver agents give significantly better bread quality than either phosphate used alone.

EXAMPLE II

In this example doughs were prepared and tested using the same test procedure as used in Example I. However, 4 parts nonfat dry milk solids, 60 p.p.m. potassium bromate, 16 p.p.m. potassium iodate and 2⅔ parts water were added to the formulation of Example I. As in Example I, five additives were tested. Additive 6 was monoammonium phosphate; Additives 7, 8 and 9 were the bread improver agents of this invention in the proportions given below and Additive 10 was monocalcium phosphate. The following table presents the results of the tests.

TABLE II

| Additive: | Maximum resistance (grams) |
|---|---|
| 6 (100% MAP) | 680 |
| 7 (3:1 MAP:MCP) | 820 |
| 8 (1:1 MAP:MCP) | 815 |
| 9 (1:3 MAP:MCP) | 750 |
| 10 (100% MCP) | 700 |

MAP = Monoammonium phosphate.
MCP = Monocalcium phosphate.

The results of these tests clearly illustrate the improvement in resistance of the dough obtained from employing the bread improver agents of this invention. These data indicate that a better bread can be made by practicing the teachings of this invention than would be made using either monoammonium phosphate or monocalcium phosphate alone.

EXAMPLE III

In this example, yeast leavened breads employing the formulations given in Table III were prepared and baked under controlled conditions.

TABLE III

| | |
|---|---|
| Flour (14% moisture basis) | 100 |
| Water (used to correct flour to 14% moisture) | Variable |
| Water (to produce dough) | 65 |
| Sugar: | |
|     1st stage | 2 |
|     2nd stage | 5 |
| Salt | 2 |
| Yeast | 3 |
| Nonfat milk solids | 6 |
| Bread improver additive (type listed below) | 0.75 |
| Oxidant (KBrO$_3$ and KIO$_3$) | .006 |
| Shortening | 3 |

The following procedure was used in the preparation of the breads. The water, yeast, 1st stage sugar, salt, nonfat milk solids, bread improver additive, and yeast food were mixed together and allowed to ferment at 100° F. for about 2½ hours.

The second stage sugar, oxidant, shortening and flour were added to the brew after it had fermented for about 2½ hours. These ingredients were mixed with the brew at relatively low speeds for about 60 seconds to form a dough. After the ingredients were premixed the dough was developed for from about 30 seconds to about 60 seconds using high speed mixing. After the doughs were developed, equal weight portions of 425 grams were placed in individual pans and proofed for 55 minutes in an atmosphere at 100° F. and at a 95% relative humidity. After proofing the bread was baked for 18 minutes at 450° F.

After baking the bread, samples were compared on the basis of volume, grain, and texture. Volume was determined by measuring the height of the loaves. Volume scores were the sum of the heights in inches of two duplicate loaves. Grain and texture were scored subjectively by a panel of observers by observing samples which were obtained by slicing the loaf at about the middle and observing the two surfaces. A perfect score for either grain or texture was 20 points. The following tables give the results of bread scores for varying additives with a milk solids content of about 6%.

TABLE IV

[Additive level 0.75%]

|  | MAP | MCP | Additive 11 | Additive 12 | Additive 13 |
|---|---|---|---|---|---|
| Volume | 6 | 7 | 8 | 7 | 8 |
| Grain | 15 | 16 | 17 | 17 | 18 |
| Texture | 14 | 16 | 17 | 17 | 17 |
| Total | 35 | 39 | 42 | 41 | 43 |

Additive 11—1:3 MAP:MCP.
Additive 12—1:1 MAP:MCP.
Additive 13—3:1 MAP:MCP.
MAP—Monoammonium phosphate.
MCP—Monocalcium phosphate.

The results of these tests show the bread prepared by using the agents of the subject invention is superior to bread in which monoammonium or monocalcium phosphate alone is used. Furthermore, these data indicate that high quality bread having a relatively high level of milk solids can be produced by the continuous process by employing the subject invention.

Breads containing 1% of the agent of the subject invention were prepared in the previous manner from the same general formulation. The following table gives bread scores on two breads employing the bread improver agents of this invention at the ratios of MAP and MSP to MCP shown below.

TABLE V

[Additives at 1% level]

| Quality | Additive 14 | Additive 15 |
|---|---|---|
| Volume | 7 | 7 |
| Grain | 17 | 17 |
| Texture | 16 | 17 |
| Total | 40 | 41 |

Additive 14—1:1 MSP:MCP.
Additive 15—1:1 MAP:MCP.

Results of these tests indicate that the bread prepared by using composition of this invention at higher levels have good bread scores.

EXAMPLE IV

In this example the effect of 1% of various bread improver additives upon the mixing tolerance of flour was determined. Tests were made using the Brabender Farinograph, which measures the consistency of the dough during mixing and is used by the baking industry to evaluate mixing tolerance. "Mixing Tolerance Index" (MTI) and "mixing tolerance" are the two most common terms used to report the mixing tolerance of a flour. Low "MTI" values indicate the ability of a flour to resist breakdown during extended mixing. "Mixing tolerance" is the time in minutes that the resistance to mixing remains above an arbitary value of 500 Brabender units; thus larger "mixing tolerance" values indicate good mixing tolerance. The following table gives the results of Farinograph tests on doughs using A.A.C.C. Farinograph Method, No. 54–21. Four bread improver agents of the subject invention were compared with monocalcium phosphate alone in doughs made from 100 parts of flour, 1 part of bread improver agent, and from 62 to 63 parts of water. (Water addition was adjusted for each dough to give a Farinograph reading of 500 Brabender units.)

TABLE VI

| Additive | MTI values (Brabender units) | Mixing tolerance (minutes) |
|---|---|---|
| 16—100% MCP | 80 | 6.3 |
| 17—50% MCP, 50% MAP | 75 | 8.5 |
| 18—50% MCP, 50% MSP | 60 | 8.8 |
| 19—25% MCP, 75% MAP | 60 | 8.5 |
| 20—25% MCP, 75% MSP | 60 | 8.8 |

From these results, it is apparent that the subject invention definitely improves the mixing tolerance of flour. For example, the agents of this invention (Additives 17, 18, 19 and 20) imparted significantly higher "mixing tolerance" to dough than did monocalcium phosphate (Additive 16). The MTI values in doughs using the agents of this invention were lower than the doughs using monocalcium phosphate alone also indicating an improved mixing tolerance. These results indicate that a greater degree of flexibility in either a continuous or conventional process for producing bread from a given flour is possible by employing the composition of this invention.

EXAMPLE V

In this example bread is made using the continuous process with a two-stage brew preparation. In the first stage 100 parts of flour, 30 parts of yeast, 50 parts of a yeast food composition, and 650 parts of water are added to an agitated, heated vessel. The yeast food composition contained about 10% by weight of calcium sulfate, 10% by weight of monocalcium orthophosphate, 15% by weight monoammonium phosphate, 25% salt (sodium chloride) and 40% starch. After the brew is heated to about 85° F. to about 90° F. for about 45 minutes, an additional 100 parts of flour, 20 parts of sugar, 20 parts of salt, 60 parts of nonfat dry milk solids and 1 part of mold inhibitor are added. After the latter ingredients are added the brew is agitated and held at about 85° F. to 90° F. for about an additional 105 minutes after which the brew is transferred to an incorporator where 800 parts of flour, 30 parts of shortening, .06 part of potassium bromate and .015 part of potassium iodate are added and mixed to form a premixed dough. After a dough is formed, it is transferred to a high speed mixer, where the dough is developed by a high degree of mixing for about 60 seconds. After the dough is developed in the high speed mixer, it is divided and panned. The bread is proofed for 60 minutes in a chamber wherein the temperature is controlled at about 100° F. at 95% relative humidity. After the before-mentioned proofing time, the bread is placed in the oven and allowed to bake for about 18 minutes at about 450° F.

The bread has good volume, and excellent grain texture, crumb color and taste characteristics and is suitable for commercial sale. Other comparable bread can be produced in the same manner as described above by replacing monoammonium phosphate with similar amounts of monosodium phosphate or monopotassium phosphate. For example, 5 parts of monosodium phosphate or 5 parts of monopotassium phosphate can be substituted for 5 parts of monoammonium phosphate and the resulting bread has good volume, grain, texture, crumb color and taste characteristics.

EXAMPLE VI

In this example bread is produced by the conventional method. About 650 parts of low mixing tolerance flour (produced from hard red winter wheat), 25 parts of yeast, 70 parts of a yeast food composition, and 390 parts of water are mixed together to form a sponge. The yeast food composition contained about 7% by weight of ammonium sulfate, about 8% by weight of monocalcium phosphate, about 10% by weight of monoammonium phosphate, 0.012% by weight of potassium bromate, 0.003% by weight of potassium iodate, about 20% by weight of salt and about 55% by weight of starch. The sponge is allowed to ferment for about 3½ hours after which 350 parts of flour, about 250 parts of water, 50 parts of nonfat milk solids, 30 parts of shortening, 20 parts of sugar, 5 parts of salt and about 1.5 parts of mold inhibitor are blended together with the sponge in a relatively low speed mixer for about 6.5 to about 12.0 minutes to form a "developed" dough. The dough is allowed to relax for about 30 minutes then is divided into loaves, rounded, rested for about 15 minutes, molded, placed into pans, allowed to proof for about 60 minutes, and then baked for about 25 minutes at about 430° F.

A commercial acceptable bread with suitable qualities of texture, grain and volume is produced by following the before-mentioned process. Comparable results can be achieved in similar processes by allowing the bread to relax from about 30 minutes to about 90 minutes. Also other comparable breads can be prepared in the same manner as described above by replacing monosodium phosphate with similar amounts of monoammonium phosphate, monopotassium phosphate or mixtures thereof. For example, 8 parts of monoammonium phosphate or 8 parts of monopotassium phosphate can be substituted for the 8 parts of monosodium phosphate to give a bread having good quality characteristics and to improve the mixing tolerance of the dough.

EXAMPLE VII

Flour compositions employing the bread improver agent of the subject invention are especially useful for not only preparing dough which is baked into bread but in addition are also useful for preparing buttermilk biscuits.

In this example, flour mixtures are prepared which contain the compositions of this invention.

Preparation of bread improver agent

One hundred parts of monocalcium phosphate are charged to a ball mill and are agitated until at least 99% of the particles pass through a U.S. Standard 100 mesh screen and at least 85% pass through a U.S. Standard 200 mesh screen. After the monocalcium phosphate particle size has been reduced, 100 parts of monoammonium phosphate and 100 parts of monosodium phosphate are charged to the same ball mill and allowed to agitate until the mixture has a particle size of essentially 100% passing through a U.S. Standard 20 mesh screen and about 96% passing through a U.S. Standard 40 mesh screen and at least 40% passing through a U.S. Standard 200 mesh screen.

Preparation of flour mixture

One thousand parts of flour are charged to a conventional ribbon mixer. To the flour, 12 parts of the bread mixture prepared as above are added and allowed to mix for one hour to insure a uniform distribution of the bread improver composition throughout the flour composition.

A flour mixture produced as above gives a dough with improved mixing tolerance and also can be used for those uses where buffering action is especially desirable. Buttermilk biscuits made using the flour mixture have good taste and color. Comparable flour mixtures can be produced by replacing the bread improver agent given in this example with substantially similar amounts of other compositions comprising a monoalkali metal orthophosphate and monocalcium orthophosphate in which the monoalkali metal orthophosphate is selected from the group consisting of monoammonium phosphate, monosodium phosphate, monopotassium orthophosphate and mixtures thereof and the weight ratio of monoalkali metal orthophosphate to monocalcium phosphate is from about 1:4 to about 4:1.

EXAMPLES VIII TO X

One of the preferred embodiments of the subject invention is to provide a "yeast food composition" which contains, in addition to other additives hereinafter described, the bread improver agent of this invention. "Yeast food compositions" are generally added to conventional bread making processes. These "yeast food compositions" generally contain in addition to the generally recognized "yeast foods," such as ammonium sulfate, dicalcium phosphate, calcium phosphate, calcium lactate, diammonium phosphate and ammonium chloride, other ingredients such as oxidants, fillers and bread improver agents. By incorporating into a "yeast food composition" at least some of the total amount of the bread improver agent which is to be added into the bread making process, a convenient means is provided for adding at least a portion of the total amount of the bread improver agent of this invention. A "yeast food composition" contains, in addition to the before-mentioned "yeast foods," typical formulations, which are preferred in the practice of this invention for conventional process of making bread, contain an oxidant, such as potassium bromate, potassium iodate, calcium iodate and calcium peroxide; a yeast food from the before-mentioned group of compounds; a filler, such as flour or starch; salt; and the bread improver composition of this invention. The ranges of weight percentages of the ingredients in the preferred yeast foods are given in Table I.

| Ingredient: | Range (weight percent in yeast food composition) |
|---|---|
| Oxidant | 0.0005 to 1.0 |
| Yeast Food | 3 to 15 |
| Salt | 0 to 35 |
| Filler | 10 to 90 |
| Bread improver composition | 5 to 60 |

While the amount of the ingredients in the yeast food compositions can vary within the ranges given, it is preferred to formulate yeast food compositions, which when used in conventional bread making in amounts of from about 0.5% to about 2.5%, will result in amounts of oxidants in the bread of from about 0.0025 to about 0.0075% by weight, amounts of yeast food in the bread from about 0.1 to about 0.25% by weight and amounts of the bread improver agent of this invention in the bread of from about 0.6% by weight to about 1.3% by weight.

Yeast food compositions are also generally used in the continuous processes for making bread. In some cases, however, it is desired to add the oxidants after the brew is fermented; and, in those instances, the yeast food compositions have similar formulations except the oxidants are not contained therein. The ranges of weight percentages in preferred yeast food for conventional processes of making bread are the same as those given in Table VII except for oxidants, which can vary from about 0% to about 1.0% in the yeast food composition.

The following yeast food compositions are prepared by admixing the components in the proportions given in a conventional ribbon mixer.

EXAMPLE VIII

| Ingredient: | Parts |
|---|---|
| Oxidants | 0.022 |
|     Potassium bromate (60%). | |
|     Potassium iodate (40%). | |

| Ingredient: | Parts |
|---|---|
| Yeast food | 7.0 |
| Ammonium sulfate. | |
| Filler | 22.978 |
| Flour (40%). | |
| Starch (60%). | |
| Salt | 20 |
| Bread improver additive | 50 |
| Monoammonium phosphate (50%). | |
| Monocalcium phosphate (50%). | |

EXAMPLE IX

| | |
|---|---|
| Oxidant | 0.65 |
| Calcium peroxide. | |
| Yeast Food | 9 |
| Diammonium phosphate (70%). | |
| Dicalcium phosphate (30%). | |
| Filler | 50.35 |
| Flour (40%). | |
| Starch (60%). | |
| Bread improver additive | 40 |
| Monosodium phosphate (75%). | |
| Monocalcium phosphate (25%). | |

EXAMPLE X

| | |
|---|---|
| Yeast food | 5 |
| Calcium lactate (20%). | |
| Calcium sulfate (80%). | |
| Filler | 40 |
| Starch. | |
| Salt | 25 |
| Bread improver additive | 30 |
| Monocalcium phosphate (40%). | |
| Monoammonium phosphate (30%). | |
| Monosodium phosphate (30%). | |

The yeast food compositions of Examples VIII and IX are useful in either the continuous or conventional processes of producing bread and the yeast food composition of Example X is especially useful in the continuous process for producing bread and give beneficial results when the foregoing yeast food compositions are added in amounts to give the preferred amounts of yeast food, oxidants, and bread improver agents in the bread as specified herein.

What is claimed is:

1. In a method for making yeast leavened bread wherein a bread dough is formed by mixing together bread making ingredients and thereafter the dough is cut, proofed, and baked to form bread, the improvement comprising incorporating as a bread improver agent into said dough prior to baking (a) a monoalkali metal orthophosphate and (b) monocalcium orthophosphate, the total amount of said bread improver agent being at least about 0.6 part per hundred parts of flour used in said bread and said monoalkali metal orthophosphate and monocalcium orthophosphate being used in weight ratios of monoalkali metal orthophosphate to monocalcium orthophosphate of from about 1:10 to about 10:1.

2. The improvement of claim 1 wherein the total amount of said bread improver agent is incorporated in said dough in amounts from about 0.6% by weight to about 1.3% by weight.

3. The method of claim 2 wherein said monoalkali metal orthophosphate is a member selected from the group consisting of monoammonium orthophosphate, monopotassium orthophosphate, monosodium orthophosphate and mixtures thereof.

4. The method of claim 2 wherein said monoalkali metal orthophosphate is monoammonium phosphate.

5. In the production of yeast leavened bread by the continuous process wherein a bread dough is formed by preliminarily mixing a fermented yeast brew with other dough forming ingredients and thereafter is mechanically worked, continuously extruded, cut into loaf pieces and baked, the improvement comprising incorporating, as a bread improver agent, into said dough prior to being mechanically worked (a) a monoalkali metal orthophosphate and (b) monocalcium orthophosphate, the total amount of said bread improver agent being at least about 0.6 part per hundred parts of flour used in said bread and with said monoalkali metal orthophosphate to monocalcium orthophosphate being used in ratios from about 1:10 to about 10:1.

6. In the production of yeast leavened bread by the continuous process wherein a bread dough is formed by preliminarily mixing a fermented yeast brew with other dough forming ingredients and thereafter is mechanically worked, continuously extruded, cut into loaf pieces and baked, the improvement comprising incorporating as a bread improver agent into said dough prior to being mechanically worked (a) a monoalkali metal orthophosphate and (b) monocalcium orthophosphate, the total amount of said bread improver agent being at least about 0.6 part per hundred parts of flour used in said bread, and said monoalkali metal orthophosphate to monocalcium orthophosphate being used in weight ratios of from about 1:4 to about 4:1.

7. The improvement of claim 6 wherein said bread improver agent is incorporated in amounts from about 0.6% to about 1.3% by weight.

8. The improvement of claim 7 wherein said monoalkali metal orthophosphate is a member selected from the group consisting of monoammonium orthophosphate, monopotassium orthophosphate, monosodium orthophosphate and mixtures thereof.

9. The improvement of claim 7 wherein said monoalkali metal orthophosphate is monoammonium orthophosphate.

10. The improvement of claim 7 wherein said weight ratio of monoalkali metal orthophosphate to said monocalcium orthophosphate is from about 3:1 to about 1:3 and said agent is incorporated in amounts of from about 0.8% to about 1.2% by weight.

11. In the production of yeast leavened bread by the conventional process wherein a dough is formed by mixing together conventional dough forming ingredients with at least some of the flour and thereafter the dough is allowed to ferment after which any remaining ingredients are added to complete the formulation and which thereafter is subjected to the steps of dividing, rounding, intermediate proofing, molding, panning, final proofing, and baking; the improvement comprising incorporating as a bread improver agent into said dough prior to baking (a) a monoalkali metal orthophosphate and (b) monocalcium orthophosphate, the total amount of said bread improver agent being at least about 0.6% by weight and with said monoalkali metal orthophosphate to monocalcium orthophosphate being used in weight ratios of from about 1:4 to about 4:1.

12. The improvement of claim 11 wherein said bread improver agent is incorporated in amounts of from about 0.6% to about 1.3% by weight.

13. The improvement of claim 12 wherein said monoalkali metal orthophosphate is a member selected from the group consisting of monoammonium orthophosphate, monopotassium orthophosphate, monosodium orthophosphate and mixtures thereof.

14. The improvement of claim 12 wherein said monoalkali metal orthophosphate is monoammonium orthophosphate.

15. In the production of yeast leavened bread by the continuous process wherein a bread dough is formed by preliminarily mixing a fermented yeast brew with other dough forming ingredients and thereafter is mechanically worked, continuously extruded, cut into loaf pieces and baked, said ingredients including more than about 2 parts of nonfat milk solids per 100 parts of flour, the improvement comprising incorporating as a bread improver agent into said dough prior to being mechanically worked (a) a monoalkali metal orthophosphate and (b) monocalcium orthophosphate, the total amount of said bread improver agent being from about 0.8 part to about 1.2 parts per 100 parts of flour used in said dough and with said monoalkali metal orthophosphate to monocalcium orthophosphate being used in weight ratios of from about 1:3 to about 3:1.

16. The improvement of claim 15 wherein said bread improver agent is added prior to the addition of said non-fat milk solids.

17. The improvement of claim 16 wherein the monoalkali metal orthophosphate is a member selected from the group consisting of monoammonium orthophosphate, monopotassium orthophosphate, monosodium orthophosphate, and mixtures thereof.

18. The improvement of claim 16 wherein said monoalkali metal orthophosphate is monoammonium orthophosphate.

19. A flour composition comprising a major proportion of flour and, as a bread improver agent, (a) a monoalkali metal orthophosphate and (b) monocalcium orthophosphate, the total amount of monoalkali metal orthophosphate and monocalcium orthophosphate being at least 0.6% by weight and with said monoalkali metal orthophosphate to monocalcium orthophosphate being present in weight ratios of from about 4:1 to about 1:4.

20. The flour composition of claim 19 wherein said monoalkali metal orthophosphate is a member selected from the group consisting of monoammonium orthophosphate, monopotassium orthophosphate, monosodium orthophosphate and mixtures thereof.

References Cited

UNITED STATES PATENTS

| | | | |
|---|---|---|---|
| 1,282,867 | 10/1918 | Kohman et al. | 99—91 |
| 1,447,054 | 2/1923 | Warner | 99—91 |
| 1,500,545 | 7/1924 | Buffington | 99—91 |
| 1,630,143 | 5/1927 | Sullivan | 99—91 |
| 3,234,027 | 2/1966 | Jertson et al. | 99—90 |
| 3,272,634 | 9/1966 | Koren et al. | 99—90 |

FOREIGN PATENTS

| | | |
|---|---|---|
| 594,287 | 3/1960 | Canada. |
| 22,434 | 1909 | Great Britain. |
| 770,072 | 3/1957 | Great Britain. |

OTHER REFERENCES

"Federal Register," Aug. 8, 1950, page 5105.

LIONEL M. SHAPIRO, *Primary Examiner.*